United States Patent
Sheaffer et al.

(10) Patent No.: US 9,164,923 B2
(45) Date of Patent: Oct. 20, 2015

(54) DYNAMIC PINNING OF VIRTUAL PAGES SHARED BETWEEN DIFFERENT TYPE PROCESSORS OF A HETEROGENEOUS COMPUTING PLATFORM

(75) Inventors: Gad Sheaffer, Haifa (IL); Boris Ginzburg, Haifa (IL); Ronny Ronen, Haifa (IL); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 13/175,489

(22) Filed: Jul. 1, 2011

(65) Prior Publication Data

US 2013/0007406 A1 Jan. 3, 2013

(51) Int. Cl.
G06F 12/08 (2006.01)
G06F 12/10 (2006.01)
G06F 12/12 (2006.01)

(52) U.S. Cl.
CPC .......... *G06F 12/126* (2013.01); *G06F 12/1027* (2013.01); *G06F 12/0804* (2013.01); *G06F 2212/303* (2013.01)

(58) Field of Classification Search
None
See application file for complete search history.

(56) References Cited

U.S. PATENT DOCUMENTS

| | | | | |
|---|---|---|---|---|
| 3,839,706 A * | 10/1974 | Borchsenius | ................. | 711/207 |
| 4,277,826 A * | 7/1981 | Collins et al. | ................. | 711/206 |
| 8,037,249 B1 * | 10/2011 | Nalder | ........................ | 711/118 |
| 2007/0299990 A1 | 12/2007 | Ben-Yehuda et al. | | |
| 2008/0028181 A1 | 1/2008 | Tong et al. | | |
| 2008/0133709 A1 * | 6/2008 | Aloni et al. | ................... | 709/218 |
| 2009/0254774 A1 | 10/2009 | Chamdani et al. | | |
| 2010/0118041 A1 * | 5/2010 | Chen et al. | ..................... | 345/542 |
| 2010/0321397 A1 * | 12/2010 | Ginzburg | ...................... | 345/531 |
| 2011/0161619 A1 | 6/2011 | Kaminski et al. | | |
| 2015/0002526 A1 * | 1/2015 | Ginzburg | ...................... | 345/568 |

FOREIGN PATENT DOCUMENTS

WO 2013/006476 A2 1/2013

OTHER PUBLICATIONS

Matt Welsh et al. "Memory Management for User-Level Network Interfaces." Mar./Apr. 1998. IEEE. IEEE Micro. vol. 18. pp. 77-82.*
Hiroshi Tezuka et al. "Pin-down Cache: A Virtual Memory Management Technique for Zero-copy Communication." Mar./Apr. 1998. IEEE. IPPS/SPDP 1998. pp. 308-314.*
International Search Report and Written Opinion received for PCT Patent Application No. PCT/US2012/045055, mailed on Feb. 28, 2013, 10 pages.

* cited by examiner

*Primary Examiner* — Nathan Sadler
(74) *Attorney, Agent, or Firm* — Douglas J. Ryder; Ryder, Lu, Mazzeo & Konieczny LLC (57) ABSTRACT

A computer system may support one or more techniques to allow dynamic pinning of the memory pages accessed by a non-CPU device (e.g., a graphics processing unit, GPU). The non-CPU may support virtual to physical address mapping and may thus be aware of the memory pages, which may not be pinned but may be accessed by the non-CPU. The non-CPU may notify or send such information to a run-time component such as a device driver associated with the CPU. In one embodiment, the device driver may, dynamically, perform pinning of such memory pages, which may be accessed by the non-CPU. The device driver may even unpin the memory pages, which may be no longer accessed by the non-CPU. Such an approach may allow the memory pages, which may be no longer accessed by the non-CPU to be available for allocation to the other CPUs and/or non-CPUs.

22 Claims, 5 Drawing Sheets

DYNAMIC PINNING OF VIRTUAL PAGES SHARED BETWEEN DIFFERENT TYPE PROCESSORS OF A HETEROGENEOUS COMPUTING PLATFORM

BACKGROUND

Computing platforms may include heterogeneous processors such as central processing units (CPUs) and non-CPUs (for example, a graphics processing unit (GPU)). Both the CPUs and non-CPUs access memory pages to perform functions such as write and read. At present, pages shared between CPU and GPU should be statically allocated in advance, and these physical memory pages should be pinned to prevent Page Fault on GPU as long as the GPU is using them.

Thus, the memory pages committed (or pinned) to the non-CPU are statically "pinned". The OS may remove such pinned memory pages from the pool of memory pages to avoid the other CPUs or non-CPUs from accessing the pinned pages. Such an approach may lead to non-optimal performance of the computer platform. Some of the challenges associated with such an approach are (1) all the memory pages required to be pinned to the non-CPU have to be identified in advance; and (2) the OS may remove the pinned pages from the pool of memory pages to avoid the pinned memory pages from being allocated to other CPUs or non-CPUs while the accessing no-CPU is still active. To determine, in advance, the memory pages, which have to be pinned is a non-deterministic and tedious process. For example, if GPU should access some small part of very large texture, CPU should still lock the whole texture. Also, removing the pinned memory pages from the pool of memory pages may reduce the memory pages available for the other CPUs and non-CPUs, thus the performance of the computing system may be reduced.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a technique to dynamic pinning of virtual pages shared between heterogeneous processors of a computing platform. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, a computing platform may support one or more techniques to dynamically allocate or pin the memory pages accessed by the non-CPU. In one embodiment, the non-CPU may support virtual to physical address mapping and may thus be aware of the memory pages, which may not be pinned but may be accessed by the non-CPU. In one embodiment, the non-CPU may notify or send such information to a run-time component such as a device driver associated with the CPU. In one embodiment, the run-time component may, dynamically, perform pinning of such memory pages, which may be accessed by the non-CPU.

In one embodiment, the run-time component may even unpin the memory pages, which may be no longer accessed by the non-CPU. Such an approach may allow the memory pages, which may be no longer accessed by the non-CPU to be available for allocation to the other CPUs and/or non- CPUs. Such an approach may improve the performance of the computing platform or a computer system, which may include such computing platforms.

Figure 1:
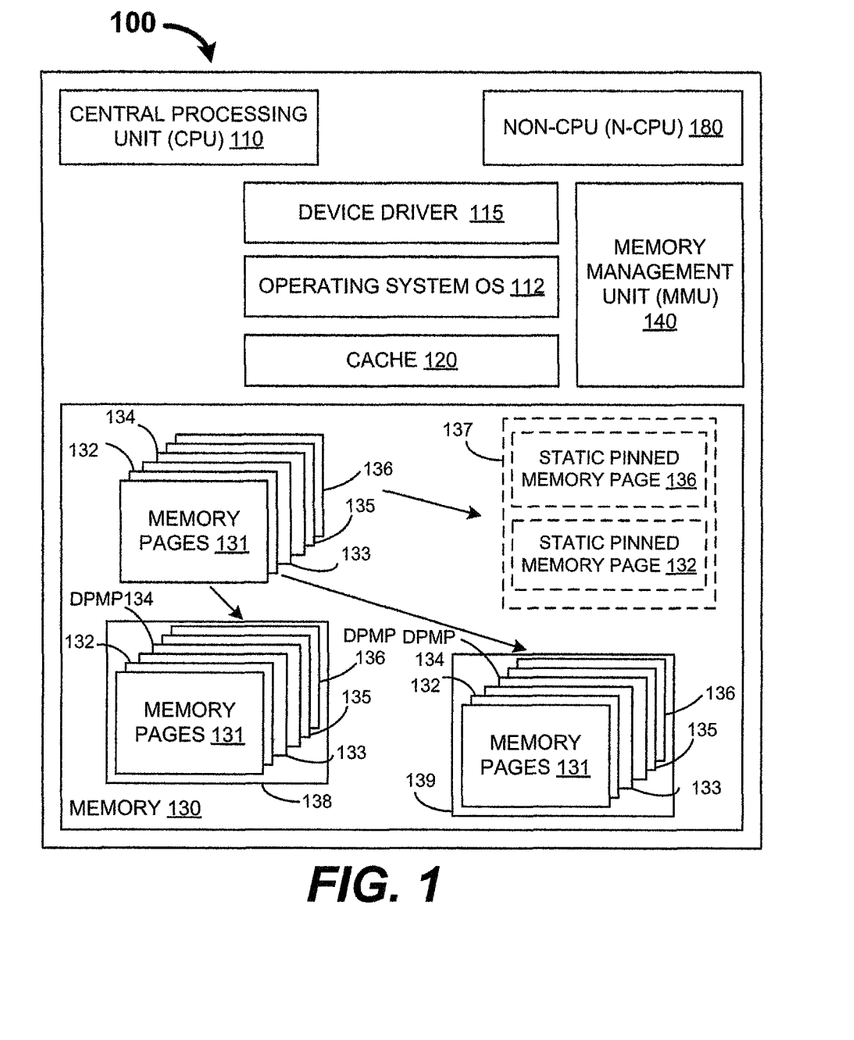
FIG. 1 illustrates a computer platform 100, which may support dynamic pinning of the memory pages accessed by a non-CPU in accordance with one embodiment.

An embodiment of a computing platform 100, which may support dynamic pinning of the memory pages accessed by a non-CPU in accordance with one embodiment is illustrated in FIG. 1. In one embodiment, the platform 100 may comprise a central processing unit (CPU) 110, an operating system (OS) 112, a device driver 115, a cache 120, a memory 130 (having a pool of memory pages 131, 132, 133, 134, 135, 136), a memory management unit 140, and non-CPU 180. In one embodiment, the memory 130 may support a shared virtual memory 130, the memory may include a CPU and non-CPU private space, which may comprise copies of multi-version data.

The non-CPU 180 may access memory pages 132 and 136 and in the absence of the embodiments described below the OS 112 may statically pin the memory pages 132 and 136 and remove the statically pinned memory pages 132 and 136 of the pool of memory pages 131 through 136. The statically pinned memory pages 132 and 136, which are removed from the pool of memory pages 131-136 is depicted as block 137.

However, in one embodiment, the non-CPU 180 may support a virtual to physical address translation. As a result, the non-CPU 180 may be aware of the memory pages, which the non-CPU (or GPU) 180 may access and determine if such memory pages are already pinned and available to GPU. In one embodiment, the non-CPU 180 may determine that a memory page, for which a virtual to physical translation was cached, for example, in a translation look aside buffer (TLB). If such a translation does not exist in TLB ("TLB miss"), in one embodiment, the non-CPU 180 attempts to translate address using Page Walking mechanism, and if such a translation failed, then non-CPU 180 may send a notification to the device driver 115 associated with the CPU 110 and the notification may include the identifier of the memory pages, which are requested by the non-CPU 180. In one embodiment, the identifier may include the address of the memory pages, which may be accessed by the non-CPU 180 that may not be pinned.

In one embodiment, the device driver 115 may receive such a notification and check the total size of the memory pinned to the non-CPU 180. In one embodiment, the device driver 115 may cause dynamic pining of a memory page or memory pages based on the notification received if the total size of the memory pages pinned to the non-CPU 180 is less than a threshold value. In one embodiment, if the total size of the memory pages pinned to the non-CPU 180 is greater than the threshold value the device driver 115 may cause some other memory pages (for example, if such memory pages have not been recently accessed by the non-CPU 180) to be unpinned to free up the space for requested pages. In one embodiment, the device driver 115 may send a first and second request to the OS 112, respectively, to pin or unpin the memory pages based on the comparison between the total number of memory pages pinned to the non-CPU 180 and the threshold value. The OS 112 may either pin or unpin the memory pages, respectively, based on the first and the second request received.

In one embodiment, during a first instance, the device driver 115 may receive a first notification and cause, for example, the memory pages 134 and 136 to be dynamically pinned as described above. In one embodiment, the dynamically pinned pages may be referred to DPMP (dynamically pinned memory page) 134 and DPMP 136 as depicted in block 138. In other instance, the device driver 115 may receive a second notification and check the total size of the memory pages pinned to the non-CPU 180 and may determine to un-pin one of the memory pages. For example, if the memory page 136 is no longer accessed by the non-CPU 180, the device driver 115 may cause the memory page 136 to be dynamically unpinned as described above. In one embodiment, the dynamically unpinned page 136 is depicted in block 139.

Such an approach may avoid the task of determining the memory pages to be pinned to the non-CPU 180 in advance. Also, the dynamic unpinning may make more memory pages available to be allocated to the other CPU and non-CPUs.

Figure 2:
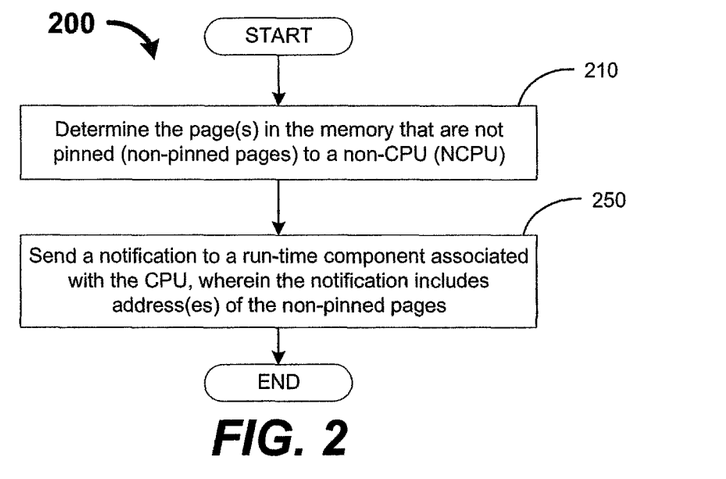
FIG. 2 is a flow-chart, which illustrates an operation performed by the non-CPU to support dynamic pinning of the memory pages accessed by a non-CPU in accordance with one embodiment.

An embodiment of an operation 200 performed by the non-CPU 180 to support dynamic pinning of the memory pages accessed by the non-CPU 180 is illustrated in FIG. 2. In block 210, the non-CPU 180 may determine the memory pages in the memory 130 that are not pined to the non-CPU 180. As described above, the non-CPU 180 may determine the identity of the memory pages, which are not-pinned using the cache translations in a TLB.

In block 250, the non-CPU 180 may send a notification to a run-time component associated with the CPU 110. In one embodiment, the non-CPU 180 may send the notification to the device driver 115. In one embodiment, the notice may include identification such as an address of the non-pinned memory pages.

Figure 3:
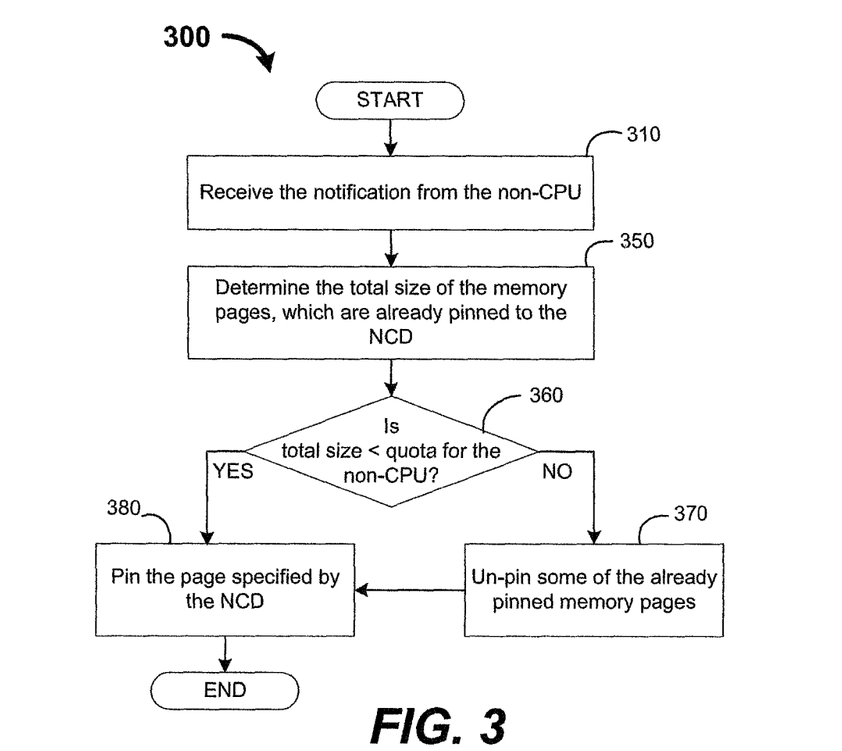
FIG. 3 is a flow-chart, which illustrates an operation performed by the CPU to support dynamic pinning of the memory pages accessed by a non-CPU in accordance with one embodiment.

An embodiment of an operation 300 performed by the CPU side components to support dynamic pining of the memory pages accessed by the non-CPU 180 is illustrated in FIG. 3. In block 310, the run-time component such as the device driver 115 may receive the notification from the non-CPU 180.

In block 350, the device driver 115 may determine the total size of the memory pages, which may be already pinned to the non-CPU 180. In block 360, the device driver 115 may check if the total size of the memory pages pinned to the non-CPU 180 is less than a quota for the non-CPU 180 and control passes to block 370 if the total size of the memory pages pinned to the non-CPU 180 is greater than the quota (or threshold) for the non-CPU 180 and to block 380 if the total size of the memory pages pinned to the non-CPU 180 is lesser than the quota (or threshold) for the non-CPU 180.

In block 370, the device driver 115 may cause the OS 112 to unpin some of the already pinned pages. As depicted in block 139 of FIG. 1, the memory page 136, which was earlier pinned (as shown in block 138) may be unpinned if the total size of the memory pages pinned to the non-CPU 180 is greater than the threshold of the quota allocated for the non-CPU 180.

However, in block 380, the device driver 115 may cause the OS 112 to, dynamically, pin some of the unpinned or available memory pages. As depicted in block 139 of FIG. 1, the memory page 136, which was earlier pinned (as shown in block 138) may be unpinned if the total size of the memory pages pinned to the non-CPU 180 is greater than the threshold of the quota allocated for the non-CPU 180.

Figure 4:
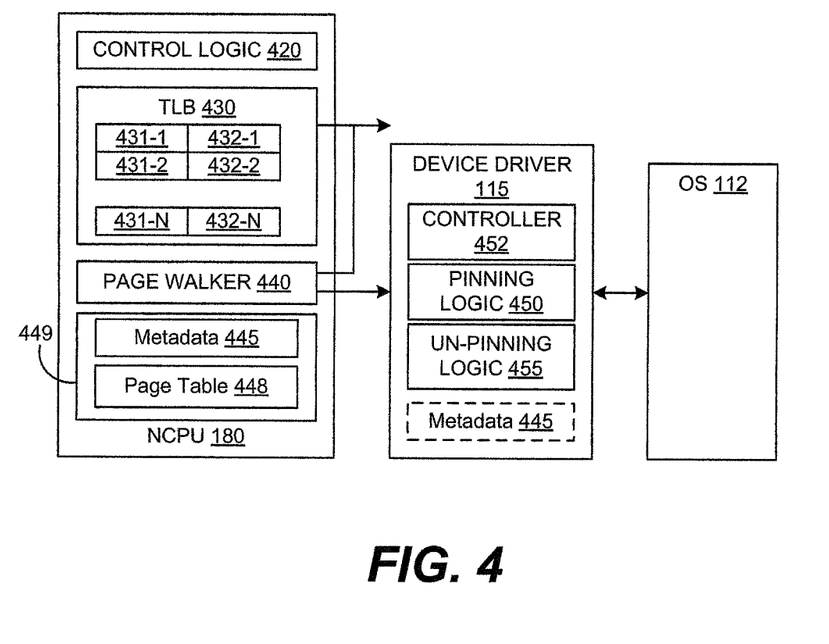
FIG. 4 illustrates a block diagram in which the non-CPU and the CPU interact with each other to support dynamic pinning of the memory pages accessed by a non-CPU in accordance with one embodiment.

A block diagram in which the non-CPU 180 and the CPU side entity such as the device driver 115 may interact with each other to support dynamic pinning and unpinning of the memory pages, respectively, accessed and un-accessed by the non-CPU 180 is illustrated in FIG. 4.

In one embodiment, the non-CPU 180 may include a control logic 420, a translation look aside buffer (TLB) 430, and a page walker 440. In one embodiment, the non-CPU 180 may further include a memory 449, which may store a metadata 445 and a page table 448. In one embodiment, the metadata 445 may include metadata to the page table 448 that may indicate whether a memory page is pinned or not. In one embodiment, the control logic 420 may generate a memory read or write and the control logic 420 may examine the entries (431-1, 432-1) to (431-N, 432-N) to determine a physical address 432 corresponding to the virtual address 431. If the virtual address to physical address mapping is not present in the TLB 430, that particular memory page may not be pinned. If the entry is not present in the TLB 440, a TLB miss may occur which may cause the control logic 420 to generate a page walk request.

In one embodiment, the page walker 440 may perform a page walk in response to receiving the page walk request. In one embodiment, the page walker 440 may traverse the OS page table to map the virtual or linear address to a physical address. In one embodiment, the page walker 440 may look-up the metadata 445 while performing a page walk to determine the pages in the memory 130 that are not pinned to the non-CPU 180 as depicted in block 210 of FIG. 2. In one embodiment, each memory page whose translations are not already cached, may be potentially accessed by the non-CPU 180 for the first time and thus may be pinned. In one embodiment, if the page walker 440 may inform the control logic 420 if the page walker 440 determines that a memory page is not pinned and the control logic 420 may send a request (for pinning) to the device driver 115 as depicted in block 250 of FIG. 2. Further, in one embodiment, the page walker 440 may also select an entry (a combination of 431, 432) in the TLB 430 and such an entry may be replaced by a new entry corresponding to a new page. In one embodiment, the control logic 420 may inform the device driver 115 of the removal of the entry. As a result, in one embodiment, the device driver 115 may also have an accurate account of any page whose translation is cached.

In one embodiment, the device driver 115 may include a controller 452, a pinning logic 450, and an un-pining logic 455. In one embodiment, the controller 452 may receive a request (as depicted in block 310 of FIG. 3) from the control logic 420 and for each request received, the controller 452 may determine (as depicted in block 350 of FIG. 3) the total size of the memory pages already pinned to the non-CPU 180 and then check (as depicted in block 360) if the total size of the memory pages is less than a threshold value. In one embodiment, the controller 462 may send a signal to the un-pinning logic 455 if the total size of the memory pages already pinned to the non-CPU 180 is greater than the threshold value.

In one embodiment, the un-pinning logic 455 may check the metadata 445 to determine if the memory page has a cache translation in the TLB 430. In one embodiment, the un-pinning logic 455 may un-pin any memory page, which may not have a TLB entry in the TLB 430. In one embodiment, a mirror copy of the metadata 445 may be maintained in the device driver 115. Also, in one embodiment, for most cases, the total number ($P_{pin}$) of pinned memory pages may be greater than the number of pages ($P_{TLB}$), which may have entries in the TLB 430.

In other embodiment, the un-pinning logic 455 may select a group of pages to un-pin and remove the entries for those pages from the TLB 430. In one embodiment, the un-pinning logic 455 may perform a selective TLB flush operation to un-pin the group of pages. In other embodiment, the un-pinning logic 455 may also perform a complete TLB flush if more than a certain number of memory pages have to be un-pinned.

In yet other embodiment, the un-pinning logic 455 may, periodically, flush the contents of the TLB 430 and while flushing the contents the memory pages may be un-pinned. In one embodiment, the periodic flushing may allow the device driver 115 to keep the most used memory pages pinned while un-pinning the other memory pages. In one embodiment, such an approach may provide the device driver 115 with more up to date information on the usage of memory pages by the non-CPU 180. In one embodiment, the pinning logic 450 may perform demand pinning or dynamic pinning based on the actual pages accessed by the non-CPU 180.

Figure 5:
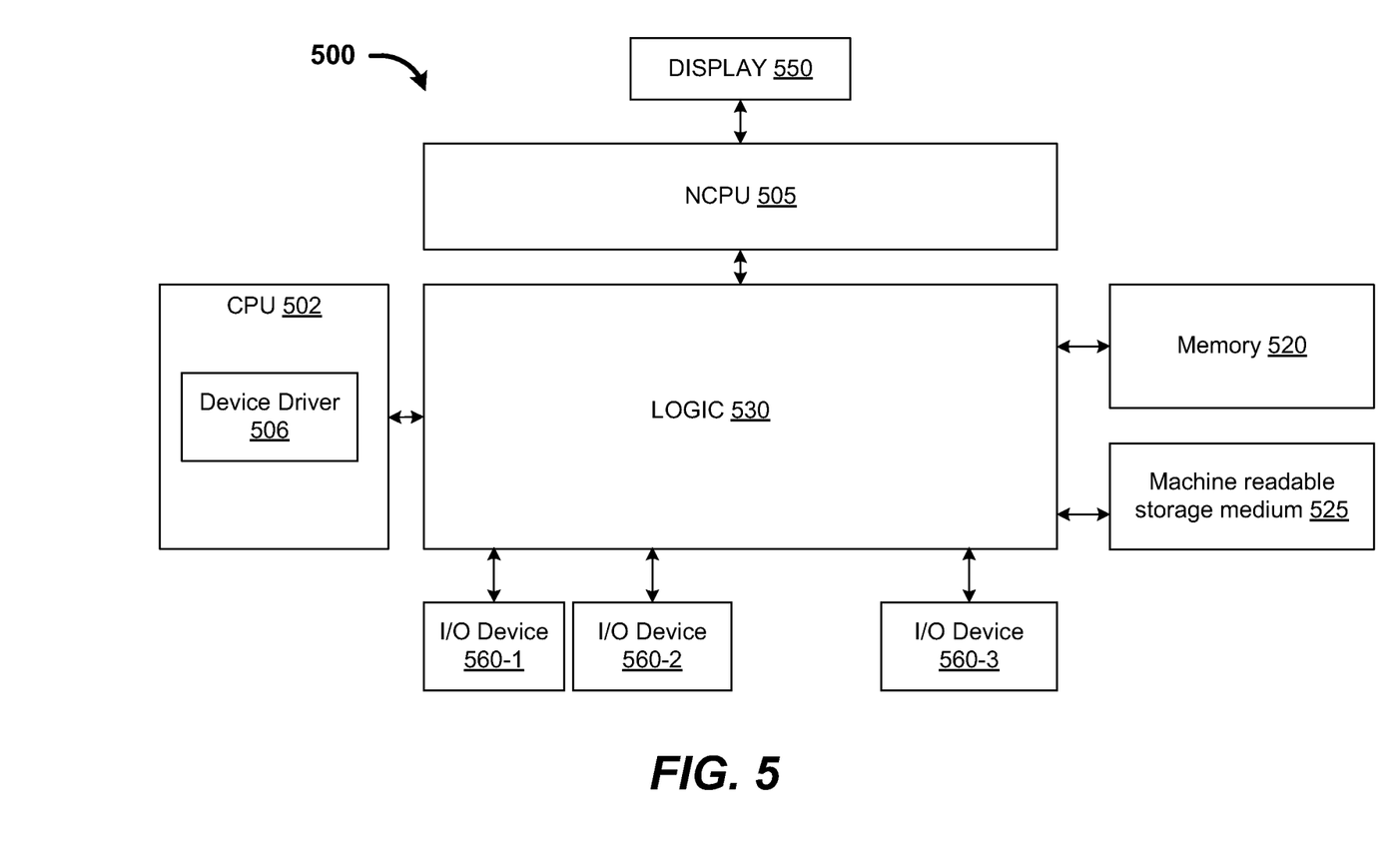
FIG. 5 illustrates a computer system that may provide support to share virtual functions stored in a shared virtual memory between heterogeneous processors provided in a computer platform in accordance with one embodiment.

An embodiment of a computer system 500 comprising the heterogeneous processors that support dynamic pinning of the memory pages accessed by the non-CPU 180 is illustrated in FIG. 5. Referring to FIG. 5, the computer system 500 may include a general purpose processor (or CPU) 502, which may include a single instruction multiple data (SIMD) processor and a non-CPU (N-CPU) 505. The CPU 502, in one embodiment, may perform enhancement operations in addition to performing various other tasks or store a sequence of instructions, to provide enhancement operations in machine readable storage medium 525. However, the sequence of instructions may also be stored in the memory 520 or in any other suitable storage medium.

While a separate NCPU (for example, a graphic processing unit, GPU) 505 is depicted in FIG. 5, in some embodiments, the processor 502 may be used to perform enhancement operations, as another example. The CPU 502 that operates the computer system 500 may be one or more processor cores coupled to logic 530. The logic 530 may be coupled to one or more I/O devices 560, which may provide interface to the computer system 500. The logic 530, for example, could be chipset logic in one embodiment. The logic 530 is coupled to the memory 520, which can be any kind of storage, including optical, magnetic, or semiconductor storage. The graphics processor unit 505 is coupled through a frame buffer to a display 550.

In one embodiment, a computer system 500 may support one or more techniques to allow dynamic pinning of the memory pages accessed by the non-CPU 180. In one embodiment, the N-CPU 505 may support virtual to physical address mapping and may thus be aware of the memory pages, which may not be pinned but may be accessed by the N-CPU 505. In one embodiment, the N-CPU 505 may notify or send such information to a run-time component such as a device driver 506 associated with the CPU 502. In one embodiment, the device driver 506 may, dynamically, perform pinning of such memory pages, which may be accessed by the N-CPU 505.

In one embodiment, the device driver 506 may even unpin the memory pages, which may be no longer accessed by the N-CPU 505. Such an approach may allow the memory pages, which may be no longer accessed by the N-CPU 505 to be available for allocation to the other CPUs and/or non-CPUs. In one embodiment, the device driver 506 is symbolically shown within the CPU 502. However, the device driver 506 may reside within the memory 520 or the machine readable storage medium 525 as well.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor or as a set of software instructions stored in a machine readable medium.

What is claimed is:

1. A method to be performed in a computing platform having a plurality of heterogeneous processors, including at least a non-central processing unit and a central processing unit, and a shared memory, the method comprising:

the central processing unit, identifying one or more memory pages pinned to the non-central processing unit but no longer accessed by the non-central processing unit;

generating a memory read/write from the non-central processing unit to a virtual address in the shared memory;

determining when a memory page in the shared memory associated with the virtual address is not pinned to the non-central processing unit;

generating and sending a request for pinning the associated memory page to a run-time component associated with the central processing unit, wherein the request includes an address for the associated memory page;

determining whether a total number of memory pages already pinned to the non-central processing unit exceeds a threshold value;

if the threshold value is exceeded, unpinning the identified one or more memory pages; and dynamically pinning the associated memory page to the non-central processing unit.

2. The method of claim 1, wherein the determining when the memory page is not pinned includes searching a translation look aside buffer (TLB) in the non-central processing unit to determine when a translation to the address for the associated memory page in the shared memory is not cached.

3. The method of claim 2, wherein the determining when the memory page is not pinned further includes obtaining the address for the associated memory page by performing a page walk of an operating system page table; and looking up metadata for the associated memory page in a page table, wherein the meta data indicates when the associated memory page is not pinned.

4. The method of claim 1, wherein the identifying includes determining a subset of memory pages that are not cached in a translation look aside buffer (TLB) for the non-central processing unit; and the unpinning includes unpinning the subset of memory pages.

5. The method of claim 1, wherein the unpinning includes performing a selective flush operation on a translation look aside buffer (TLB) in the non-central processing unit to remove the identified one or more memory pages.

6. The method of claim 1, further comprising periodically, flushing contents of a translation look aside buffer (TLB) in the non-central processing unit, and unpinning the memory pages associated with the non-central processing unit.

7. A non-transitory machine-readable storage medium comprising a plurality of instructions that in response to being executed result in a computer system comprising at least a non-central processing unit, a central processing unit, and a shared memory therebetween:

the central processing unit, identifying one or more memory pages pinned to the non-central processing unit but no longer accessed by the non-central processing unit;

generating a memory read/write from the non-central processing unit to a virtual address in the shared memory;

determining when a memory page in the shared memory associated with the virtual address is not pinned to the non-central processing unit;

generating and sending a request for pinning the associated memory page to a run-time component associated with the central processing unit, wherein the request includes an address for the associated memory page;

determining whether a total number of memory pages already pinned to the non-central processing unit exceeds a threshold value;

if the threshold value is exceeded, unpinning the identified one or more memory pages; and dynamically pinning the associated memory page to the non-central processing unit.

8. The non-transitory machine-readable storage medium of claim 7, wherein the instructions in response to being executed further result in the computer system searching a translation look aside buffer (TLB) in the non-central processing unit to determine when a translation to the address for the associated memory page in the shared memory is not cached.

9. The non-transitory machine-readable storage medium of claim 8, wherein the instructions in response to being executed further result in the computer system:

obtaining the address for the associated memory page by performing a page walk of an operating system page table; and looking up metadata for the associated memory page in a page table, wherein the meta data indicates when the associated memory page is not pinned.

10. The non-transitory machine-readable storage medium of claim 7, wherein the instructions in response to being executed further result in the computer system:

determining a subset of memory pages that are not cached in a translation look aside buffer (TLB) for the non-central processing unit; and unpinning the subset of memory pages.

11. The non-transitory machine-readable storage medium of claim 7, wherein the instructions in response to being executed further result in the computer system:

performing a selective flush operation on a translation look aside buffer (TLB) in the non-central processing unit to remove the identified one or more memory pages.

12. The non-transitory machine-readable storage medium of claim 7, wherein the instructions in response to being executed further result in the computer system:

periodically, flushing contents of a translation look aside buffer (TLB) in the non-central processing unit, and unpinning the memory pages associated with the non-central processing unit.

13. A computing system having a plurality of heterogeneous processors including at least a non-central processing unit and a central processing unit, and a shared memory therebetween, wherein the central processing unit is to:

identify one or more memory pages pinned to the non-central processing unit but no longer accessed by the non-central processing unit;

receive a request for pinning a memory page to the non-central processing unit, wherein the memory page is associated with a memory read/write from the non-central processing unit to a virtual address in the shared memory, and wherein the request includes an address for the associated memory page;

determine whether a total number of memory pages already pinned to the non-central processing unit exceeds a threshold value;

if the threshold value is exceeded, unpin the identified one or more memory pages; and dynamically pin the associated memory page to the non-central processing unit.

14. The computing system of claim 13, wherein the central processing unit is further to:
   determine a subset of memory pages that are not cached in a translation look aside buffer (TLB) for the non-central processing unit; and
   unpin the subset of memory pages.

15. The computing system of claim 13, wherein the central processing unit is further to perform a selective flush operation on a translation look aside buffer (TLB) in the non-central processing unit to remove the identified one or more memory pages.

16. The computing system of claim 13, wherein the central processing unit is further to:
   periodically, flush contents of a translation look aside buffer (TLB) in the non-central processing unit, and
   unpin the memory pages associated with the non-central processing unit.

17. A computer system comprising;
   a shared memory; and
   a plurality of heterogeneous processors including at least a non-central processing unit and a central processing unit, wherein
   the non-central processing unit is to:
      generate a memory read/write from the non-central processing unit to a virtual address in the shared memory;
      determine when a memory page in the shared memory associated with the virtual address is not pinned to the non-central processing unit;
      generate and send a request for pinning the associated memory page to a run-time component associated with the central processing unit, wherein the request includes an address for the associated memory page; and
   the central processing unit is to:
      identify one or more memory pages pinned to the non-central processing unit but no longer accessed by the non-central processing unit;
      determine whether a total number of memory pages already pinned to the non-central processing unit exceeds a threshold value;
      if the threshold value is exceeded, unpin the identified one or more memory pages; and
      dynamically pin the associated memory page to the non-central processing unit.

18. The computing system of claim 17, wherein the non-central processing unit is further to search a translation look aside buffer (TLB) in the non-central processing unit to determine when a translation to the address for the associated memory page in the shared memory is not cached.

19. The computing system of claim 18, wherein the non-central processing unit is further to:
   obtain the address for the associated memory page by performing a page walk of an operating system page table; and
   look up metadata for the associated memory page in a page table, wherein the meta data indicates when the associated memory page is not pinned.

20. The computing system of claim 7, wherein the central processing unit is further to:
   determine a subset of memory pages that are not cached in a translation look aside buffer (TLB) for the non-central processing unit; and
   unpin the subset of memory pages.

21. The computing system of claim 17, wherein the central processing unit is further to perform a selective flush operation on a translation look aside buffer (TLB) in the non-central processing unit to remove the identified one or more memory pages.

22. The computing system of claim 17, wherein the central processing unit is further to:
   periodically, flush contents of a translation look aside buffer (TLB) in the non-central processing unit, and
   unpin the memory pages associated with the non-central processing unit.

* * * * *